April 14, 1931. W. H. APPLEBY 1,800,587
CHILD'S VEHICLE
Filed Sept. 16, 1929
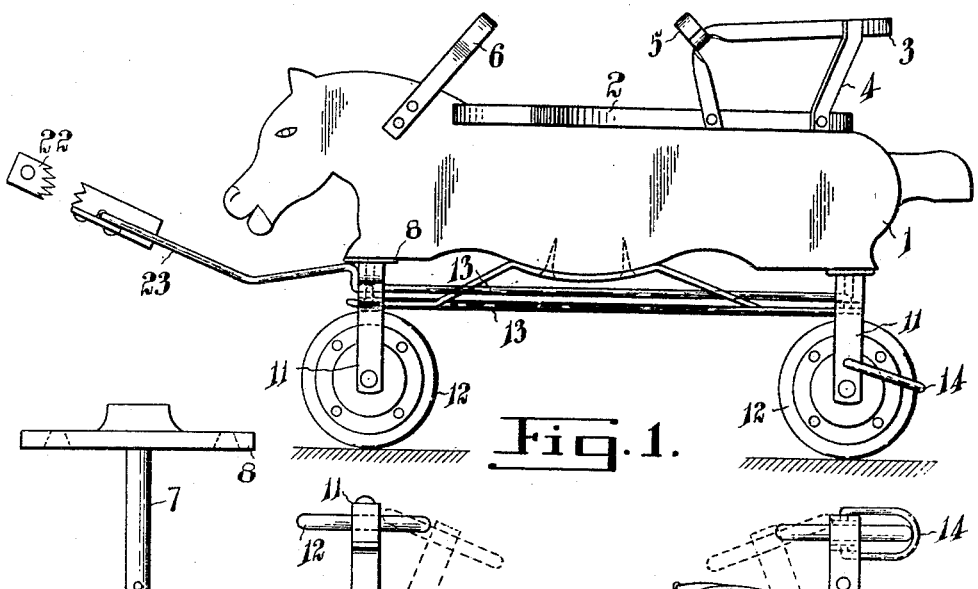
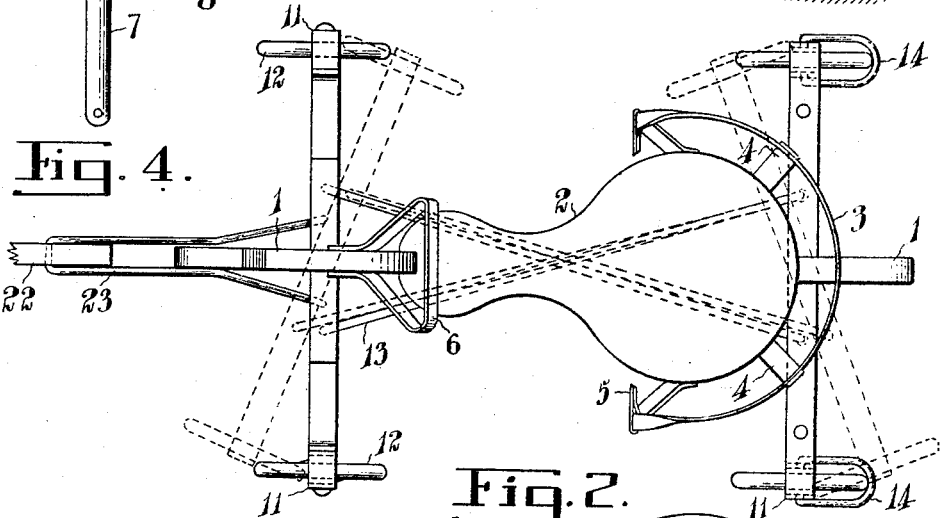
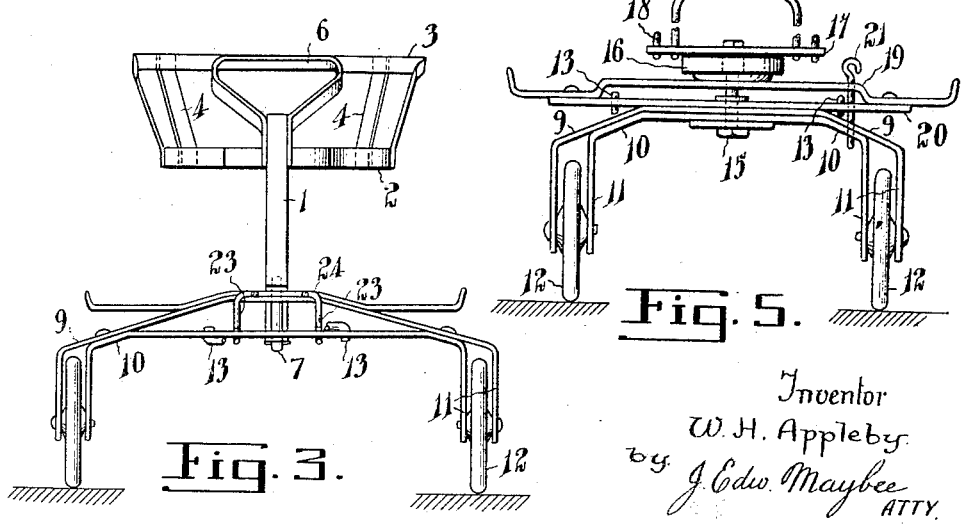
Inventor
W. H. Appleby
by J. Edw. Maybee
ATTY.

Patented Apr. 14, 1931

1,800,587

UNITED STATES PATENT OFFICE

WILLIAM H. APPLEBY, OF LONDON, ONTARIO, CANADA

CHILD'S VEHICLE

Application filed September 16, 1929. Serial No. 392,899.

This invention relates to vehicles for children's use, and my object is to devise a vehicle adapted either for propulsion by the rider or for traction through the medium of a tongue, and more particularly to provide a novel means of propulsion by the rider which will dispense with the use of cranks and lever systems.

I attain my objects by means of the constructions which may be briefly described as follows. A body provided with a seat carries king pins on which the front and rear axles are both journalled. Pivoted cross links connect the two axles so that the axles will swing simultaneously but in opposite directions. Each axle carries two wheels, but the wheels of one axle are engaged by brakes preventing backward rotation of the wheels. Propulsion of the vehicle may thus be effected by alternately swinging the other axle to the right and left which may be effected by the feet of the rider. Alternatively a separate lever may be employed concentrically pivoted with one axle and connected by links with the other axle, leaving the first-mentioned axle free for steering purposes. A tongue is provided having hounds adapted to be hooked into the front axle when the vehicle is to be drawn by a pedestrian.

The invention is hereinafter more fully described and is illustrated in the accompanying drawings in which Fig. 1 is a side elevation of a vehicle constructed in accordance with my invention;

Fig. 2 a plan view of the same;

Fig. 3 a front elevation;

Fig. 4 a side elevation of one of the king bolts; and

Fig. 5 a front elevation of a modification of the propelling and steering mechanism.

In the drawings like numerals of reference indicate corresponding parts in the different figures.

Referring to the drawings, the body of the vehicle in the embodiment shown comprises a vertical board 1, in the present case cut to the outlines of a horse, and a horizontal board 2 secured thereto to form a seat. The rear end of this seat is provided with a semi-circular rail 3 supported by uprights 4 from the edge of the seat. A strap 5 is also provided, by means of which a child may be secured in position. A bail 6 secured to the forward part of the board 1 forms a hand grip. The chassis of the vehicle is connected with the body by means of the king pins 7 shown in detail in Fig. 4. Each king pin is preferably formed integral with or connected to a plate 8 provided with screw holes, whereby it may be secured to the lower edge of the board 1.

It is evident that, by removing the screws securing the plate 8 in place, any given body may be removed and substituted by another body of the same or different form, thus enabling the vehicle to be supplied with different bodies to suit different tastes or requirements.

The chassis of the vehicle in the form shown in Figs. 1, 2 and 3 of the drawings comprises two similar axles, each formed of two members 9, 10 spread apart at their middle portions and pivoted on one of the king pins as shown. Adjacent their outer ends, these members are secured together and bent downwardly to form jaws 11 between which the wheels 12 are journalled. The axles are connected by means of links 13, which are preferably crossed, as shown, so that, when one of the axles is turned on its king pin, the other axle is also moved in the reverse direction, which facilitates steering and enables the vehicle to turn on a short radius.

The wheels of one axle are provided with means preventing their backward rotation. While any means might be employed for this purpose, a simple device is shown in the drawings, comprising a bail 14 pivoted against the end of the axle and resting on the tire of the wheel.

The operation of the device is as follows: The operator sits on the seat 2 and braces his feet on the front axle. He then pushes forward first with one foot and then with the other, thus imparting a forward movement to each front wheel alternatively. This movement is imparted to the rear wheels by means of the connecting links between the front and rear axles. The bails 14, 14 on the rear wheels permit the forward movement thereof, but act as a brake to prevent one wheel from rotating backwards while the other wheel is advanced. This alternate forward movement of the wheels causes the vehicle to move forward.

The front axle acts as a lever fulcrumed intermediate its ends for imparting the alternate forward movements to the rear axle, and hence may be supported by any other means than the front wheels, as shown in Figs. 1, 2 and 3.

In Fig. 5 a modification of the forward axle is shown. The members 9 and 10 of the axle are secured to the lower end of a vertical spindle 15 which passes through a member 16 which will form part of the body of the vehicle. To the upper end of the spindle 15 is secured a cross bar 17 with which may be connected the fork 18 of a handle by which the vehicle may be drawn. Intermediate of the member 16 and the axle is positioned a transversely arranged lever of the first order comprising members 19 and 20 secured together. To this transverse lever are pivotally connected the links 13, instead of directly to the axle, as in the form shown in Figs. 1 to 3 of the drawings. The rear axle may thus be operated without any corresponding movement of the front wheels, which may be used for steering purposes solely. When desired, however, a pin 21 may be inserted through alined holes in the members 19, 20, 9 and 10 when the front axle assembly acts in the same manner as the front axle assembly of Figs. 1 to 3 of the drawings. In these figures of the drawings a handle 22 is provided with a fork 23 detachably hooked into holes, not shown, formed in the member 10. The fork members are also offset to provide a shoulder 24 adapted to engage the upper member 9 to prevent the handle coming into contact with the forward end of the body.

A vehicle such as described may be readily propelled by the rider in the manner hereinbefore described, in which case the handle is removed. At the same time, if the vehicle is to be drawn by hand, the handle is readily positioned for use.

What I claim as my invention is:

1. A vehicle having an axle journalled thereon to swing horizontally; wheels journalled on said axle; means preventing backward rotation of said wheels; and means carried by the vehicle whereby the said axle may be oscillated to alternately advance the wheels.

2. A vehicle comprising a body; wheels supporting the body; an axle connected by a king pin to the body and carrying two of the wheels; means preventing backward rotation of the wheels of said axle; a transverse lever fulcrumed intermediate of its ends adjacent the forward part of the body; a pivoted link connecting said lever with the axle; and a seat positioned on the body from which the rider may actuate the aforesaid lever with his feet.

3. A vehicle comprising a body; front and rear axles pivotally connected to the vehicle to swing horizontally; a pair of wheels carried by each axle; a transverse lever of the first order pivoted on the body; a cross link pivotally connected to one axle and the lever whereby the axle may be swung on its pivot; and means preventing the backward rotation of the wheels of the said axle.

4. A vehicle comprising a body; king pins connected with the body; axles each comprising an upper and a lower member spaced apart at the middle and journalled on one of the king pins and secured together adjacent the ends, the ends being turned down to form jaws; and wheels journalled between the jaws.

5. A vehicle having an axle journalled thereon to swing horizontally; wheels journalled on said axle; a bail pivoted adjacent each end of one of the axles and resting on the tire of an adjacent wheel to prevent backward rotation of the wheel; and means carried by the vehicle whereby the said axle may be oscillated.

6. A vehicle comprising a body; front and rear axles pivotally connected to the vehicle to swing horizontally; a pair of wheels carried by each axle; a transverse lever of the first order pivoted on the body and concentric with one axle; a cross link pivotally connected to the other axle and the lever whereby the axle may be swung on its pivot; means preventing the backward rotation of the wheels of the said axle; and releasable means for locking together the other axle and the lever.

7. A vehicle comprising a body; a wheeled support for one end of the body; an axle journalled on a king pin adjacent the other end of the body; wheels journalled on said axle; and means permitting forward rotation and preventing backward rotation of said wheels, said axle being adapted to be oscillated to alternately advance the wheels.

8. A vehicle comprising a body; a wheeled support for one end of the body; an axle journalled on a king pin adjacent the other end of the body; wheels journalled on said axle; and a bail pivoted adjacent each end of one of the axles and resting on the tire of an adjacent wheel to prevent backward rotation of the wheel.

9. A vehicle comprising a body; a king pin connected with the body; an axle comprising an upper and a lower member spaced apart at the middle and journalled on the king pin, the members being inclined towards one another from the middle towards the ends and secured together, the ends being turned down to form jaws; and wheels journalled between the jaws.

Signed at Toronto, Canada, this 28th day of August, 1929.

WILLIAM H. APPLEBY.